United States Patent [19]

Orazi

[11] Patent Number: 5,652,819
[45] Date of Patent: Jul. 29, 1997

[54] METHOD FOR TUNING FIBER OPTIC COUPLERS AND MULTIPLEXERS

[75] Inventor: Richard J. Orazi, San Diego, Calif.

[73] Assignee: The United States of America as represented by the Secretary of the Navy, Washington, D.C.

[21] Appl. No.: 538,432

[22] Filed: Aug. 9, 1995

[51] Int. Cl.$^6$ ...................................................... G02B 6/26
[52] U.S. Cl. ............................... 385/51; 385/37; 385/43; 385/48
[58] Field of Search ...................... 385/51, 43, 96, 385/37, 48, 27, 28, 30, 31, 9, 10; 430/290

[56] References Cited

U.S. PATENT DOCUMENTS

| | | | |
|---|---|---|---|
| 5,058,979 | 10/1991 | Yamauchi | 385/28 |
| 5,367,588 | 11/1994 | Hill et al. | 385/37 |
| 5,404,415 | 4/1995 | Mori et al. | 385/51 |
| 5,459,801 | 10/1995 | Snitzer | 385/30 |
| 5,491,764 | 2/1996 | Hu et al. | 385/51 |

OTHER PUBLICATIONS

W. X. Xie et al., "Experimental evidence of two types of photorefractive effects occurring during photoinscriptions of Bragg gratings within germanosilicate fibers", *Optics Communications*, 104, (1993, pp. 185–195.
P. J. Lemaire et al., "Technique for Achieving Ultrahigh UV Photosensitivity and Thermal Sensitivity in GeO$_2$ Doped Optical Fibres", *Electronics Letters*, vol. 29, No. 13, 24 Jun. 1993, pp. 1191–1193.

*Primary Examiner*—Rodney B. Bovernick
*Assistant Examiner*—Hemang Sanghavi
*Attorney, Agent, or Firm*—Harvey Fendelman; Michael A. Kagan; Eric James Whitesell

[57] ABSTRACT

A method for tuning fiber optic coupler and wavelength division multiplexer devices comprises the steps of fusing optical fibers having a refractive index responsive to ultraviolet radiation to form a coupling region having a coupling ratio dependent upon the refractive index, and subjecting the coupling region to ultraviolet radiation to adjust the coupling ratio to a predetermined value at a given operating wavelength.

10 Claims, 4 Drawing Sheets

METHOD FOR TUNING FIBER OPTIC COUPLERS AND MULTIPLEXERS

BACKGROUND OF THE INVENTION

The present invention relates to fused fiber optic coupler and wavelength division multiplexer (WDM) devices. More specifically, but without limitation thereto, the present invention relates to a method for modifying the coupling ratio and wavelength dependence of these devices.

Fiber optic couplers and wavelength division multiplexers are generally manufactured by placing two optical fibers in parallel contact, applying heat to fuse them together over an appropriate length, thereby forming a coupling region, and applying tension on the ends of the optical fibers to impart an elongated taper to the coupling region.

FIG. 1 shows the power transfer through the coupling region of a typical fiber optic coupler as a function of elongation of the coupling region. After reaching a maximum, the coupling ratio oscillates in a sinusoidal manner. It is believed that the sinusoidal envelope associated with the greater elongation is due to polarization birefringence in the coupling region.

Wavelength division multiplexers, such as described in U.S. Pat. No. 5,121,453 filed on Jun. 9, 1992 and incorporated herein by reference thereto, may be made by halting the elongation process after a predetermined number of oscillations of the coupling ratio, or power transfer cycles, have occurred. In general, the more power transfer cycles (i.e., the greater the elongation or taper), the narrower the wavelength channel spacing will be as determined by the distance between power transfer minima and maxima relative to wavelength. The tapering process is halted at a point preferably as close as possible to a maximum coupling ratio (preferably 100%) at the operating wavelength, with a minimum coupling ratio (preferably 0%) at the wavelength of the desired channel spacing. This is done to minimize crosstalk between channels.

Precise halting of the tapering process is hindered by several factors, however. For example, after many power transfer cycles, changes in the coupling ratio occur rapidly with changes in optical fiber length, so that a small change in optical fiber length results in a relatively large change in the coupling ratio. In addition, once the tapering process is halted, the fused structure is usually packaged to prevent changes in the coupling ratio from occurring due to mechanical stress. Typically this is done by epoxying or soldering the optical fibers to a substrate. The process of attaching the optical fibers to the substrate may change the tension applied to the optical fibers, however, causing a change in length and a corresponding change in the coupling ratio or shift in the operating wavelength. The packaged device thus often fails to have the desired coupling ratio at the specified operating wavelength, and may even be rendered useless for the intended application, resulting in decreased yields and higher unit costs.

SUMMARY OF THE INVENTION

The method for tuning fiber optic couplers and wavelength division multiplexers of the present invention addresses the problems described above, and may provide further related advantages. The following description of a method for tuning fiber optic couplers and wavelength division multiplexers does not preclude other embodiments and advantages of the present invention that may exist or become obvious to those skilled in the art.

A method for tuning fiber optic coupler and wavelength division multiplexer devices comprises the steps of fusing optical fibers having a refractive index responsive to ultraviolet radiation to form a coupling region having a coupling ratio dependent upon the refractive index, and subjecting the coupling region to ultraviolet radiation to adjust the coupling ratio to a predetermined value at a given operating wavelength.

An advantage of the method of the present invention for tuning fiber optic coupling devices is that these devices may be tuned to meet original specifications after the devices are packaged, thus precluding the lower yields and higher unit costs resulting from mechanical stress during packaging.

Another advantage is that the physical dimensions of the devices are not changed during the tuning process, thus there is no added strain or relaxation effects that might otherwise occur.

Yet another advantage is that the tuning process has no measurable effect on the optical loss of the device.

Still another advantage is that the tuning process produces no measurable increase in optical back reflection.

Another advantage is that since most fiber optic couplers are made using a UV cured epoxy to attach the fused optical fibers to a substrate, a UV source may already be available for the tuning method of the present invention.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

The literature has recently reported that ultraviolet radiation may alter the refractive index of the glass core of an optical fiber as described in "Experimental evidence of two types of photorefractive effects occurring during photoinscriptions of Bragg gratings within germanosilicate fibres", W. X. Xie, et al; Optics Communications 104 (1993) 185–195. It is believed that ultraviolet radiation creates defects associated with dopant atoms present inside the cores of most standard types of optical fibers to increase the index of refraction. Besides the addition of dopants such as germanium, the sensitivity of the index of refraction to ultraviolet radiation may also be increased by the introduction of hydrogen atoms into the heated core structure, as described in "Technique for achieving ultrahigh UV photosensitivity and thermal sensitivity in $GeO_2$ doped optical fibres", P. J. Lemaire, et al; Electronics Letters, 24 Jun. 1993, Vol. 29, No. 13, pp. 1191–1192.

Figure 1:
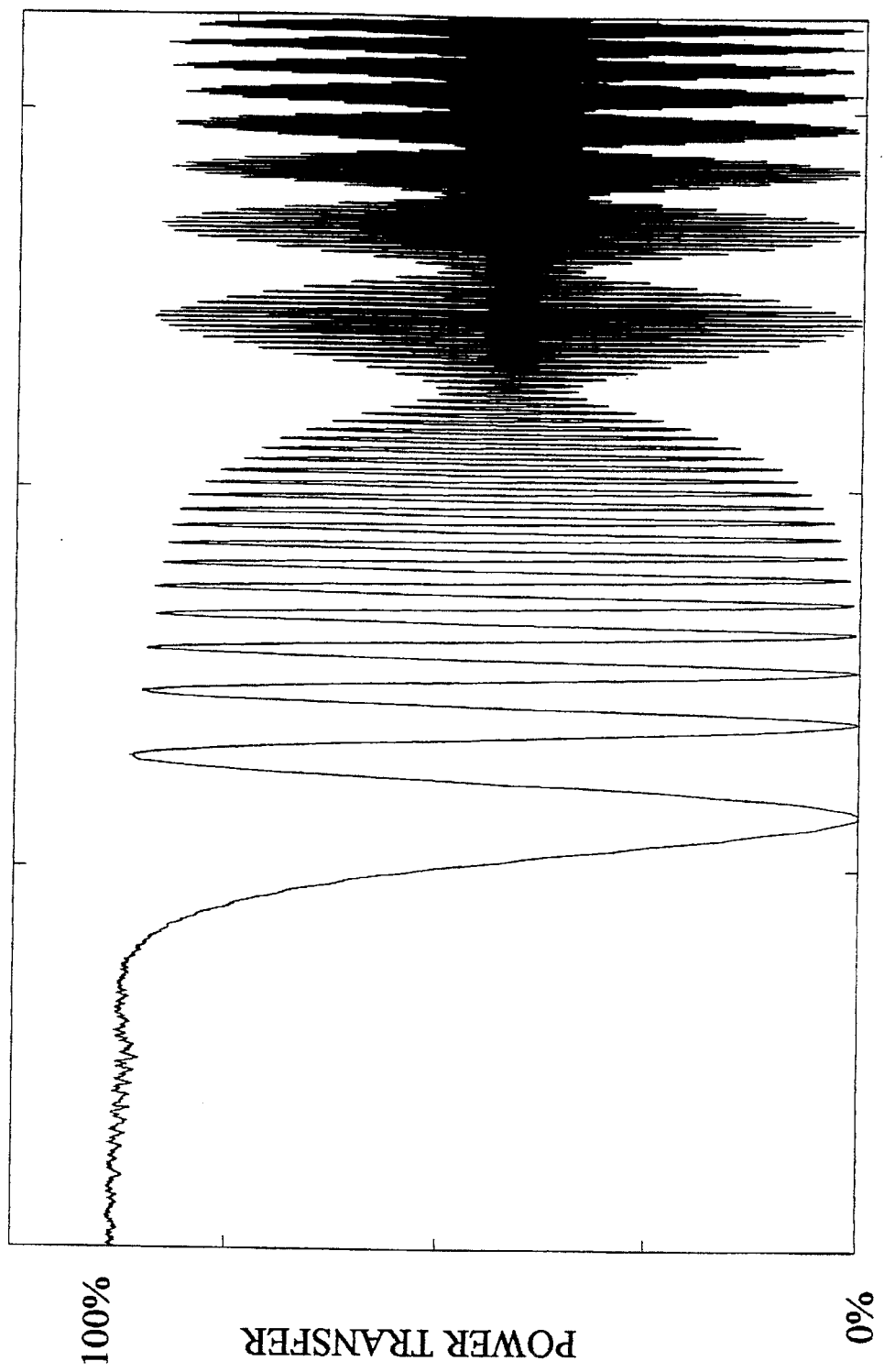
FIG. 1 is a plot of the coupled power of a typical fiber optic coupler vs. coupling region length.

The coupling ratio defined by the coupled power of a typical fiber optic coupler plotted as a function of wavelength in FIG. 1 has a characteristically sinusoidal appearance, which may be represented mathematically as $$P_c = P_o \sin^2(CL), \qquad (1)$$

where $P_c$=coupled power, $P_o$=input power,

C=coupling coefficient within the fused region, and

L=effective length of the optical fibers

The effective length L may also be expressed as L=nl, where n is the index of refraction of the optical fibers, and l is the physical length of the optical fibers. The coupling coefficient may be expressed as $$C = a\lambda + C_o, \qquad (2)$$

where a and $C_o$ are empirical constants and $\lambda$ is the operating wavelength.

The wavelength dependence of the coupling ratio may be exploited to make wavelength division multiplexers (WDM), wherein light of one wavelength $\lambda_a$ has a coupling ratio approaching 0% and that light of another wavelength $\lambda_b$ at the desired channel spacing has a coupling ratio approaching 100%. To achieve these ratios in equation (1) above, $C(\lambda_a)L=N\Pi$ and $C(\lambda_b)L=(N+\frac{1}{2})\Pi$, where N represents the number of power transfer cycles. For a channel separation of $$\Delta\lambda_{wdm} = \lambda_b - \lambda_a \qquad (3)$$

the coupler length may be expressed as $$l = \Pi/[2an \, \Delta\lambda_{wdm}]. \qquad (4)$$

For a WDM having a coupling ratio minimum at a wavelength $\lambda_a$ after N power transfer cycles such that $C(\lambda_a)L=N\Pi$, $$\lambda_a = N\Pi/anl - C_o/a. \qquad (5)$$

If the index of refraction of the optical fiber is changed by $\Delta n$, the wavelength shift may be expressed as $$\Delta\lambda_a = [N\Pi/al][-\Delta n/n^2]. \qquad (6)$$

Substituting equation (4) into equation (6) yields $$\Delta\lambda_a/\Delta\lambda_{wdm} = -2N\Delta n/n. \qquad (7)$$

Figure 2:
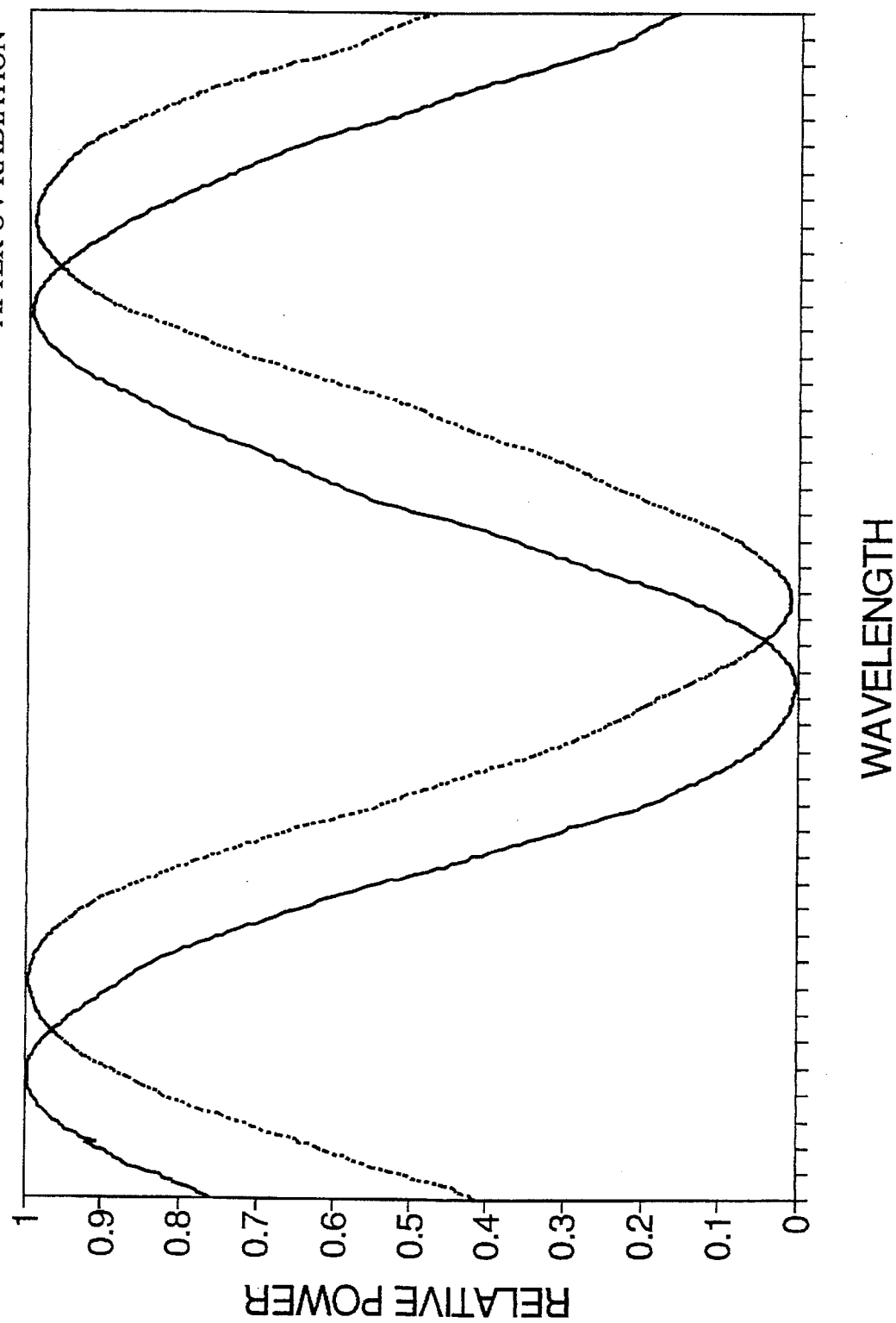
FIG. 2 is a plot of the coupling ratio of a fiber optic coupler vs. operating wavelength before and after exposure to ultraviolet radiation.

The wavelength change viewed as a percentage of the overall WDM channel spacing may thus be expressed as the percentage change in the index of refraction times twice the number of power transfer cycles. If the number of power transfer cycles is large, even a small change in the index of refraction may effect a significant wavelength shift. FIG. 2 shows a wavelength shift in a fiber optic coupler tuned by the method of the present invention before and after exposure to ultraviolet radiation. In this example, the operating wavelength was shifted by about 3.5 nm.

Since WDMs having relatively narrow channel separations are typically made with a large number of power transfer cycles, the method of the present invention is particularly applicable to these devices. One reason is that a device made with a high number of power transfer cycles is more likely to be out of tolerance due to packaging stresses as described above. Another reason is that the high number of power transfer cycles results in a greater range of adjustment obtainable by controlled exposure of part or all of the coupling region to ultraviolet radiation.

Figure 3:
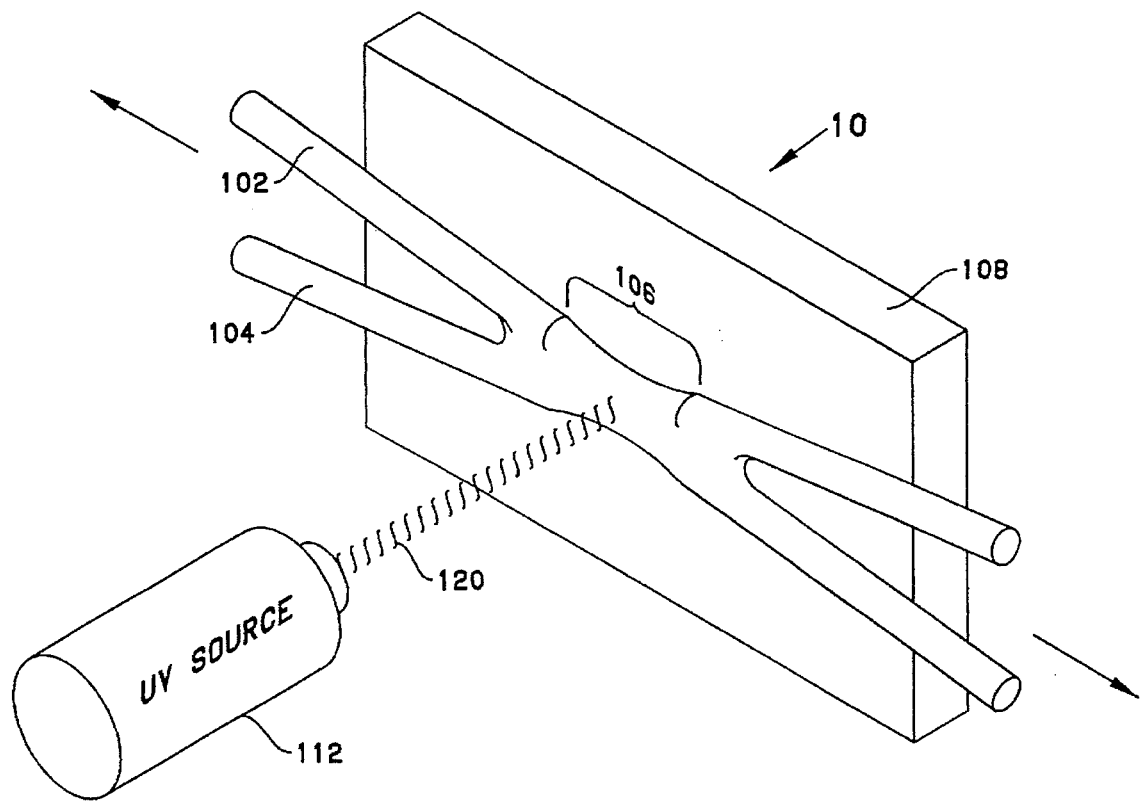
FIG. 3 is a diagram of a fiber optic device of the present invention.
Figure 4:
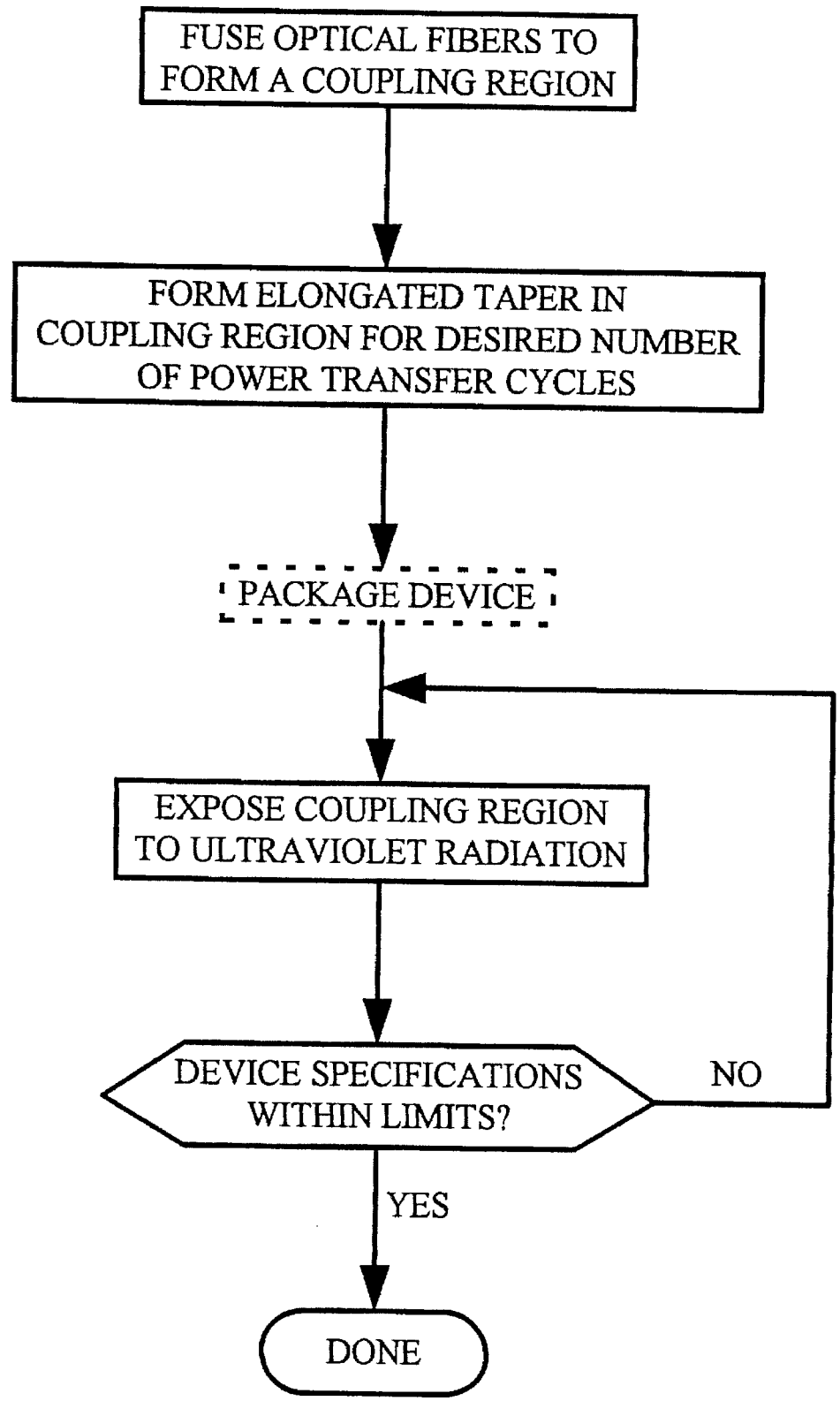
FIG. 4 is a flow chart of the method of the present invention for tuning a fiber optic coupler.

Referring now to the fiber optic device in FIG. 3 and the flow chart of FIG. 4, optical fibers 102 and 104 may be, for example, standard commercially available $GeO_2$ doped optical fibers are fused together to form a fiber optic coupler 10 having a coupling region 106. Coupling region 106 is elongated in the direction of the horizontal arrows until a sufficient number of power transfer cycles is reached to establish a predetermined channel spacing between the maximum and minimum coupling ratio. Fiber optic coupler 10 may then be packaged according to well known techniques, such as on a substrate 108 to prevent mechanical stress from causing the channel spacing to change. Coupling region 106 is then exposed to ultraviolet radiation 120 from a UV source 112 until the operating wavelength and coupling ratio are adjusted to within specified limits. UV source 112 preferably ranges in wavelength from 200 nm to 350 nm. Performing the tuning process after the device is packaged preserves the stability of the adjustment. Exposure to ultraviolet radiation 120 may be controlled with precision by pulsing an ultraviolet radiation source in a single measured pulse or in a series of shorter pulses until the desired adjustment in operating wavelength or coupling ratio is achieved. UV source 112 may include fiber optic bundles, mirrors, and lenses to confine ultraviolet radiation 120 to coupling region 106.

Other modifications, variations, and applications of the present invention may be made in accordance with the above teachings other than as specifically described to practice the invention within the scope of the following claims.

I claim:

1. A method for adjusting the coupling ratio of a fiber optic device comprising fused optical fibers having a refractive index responsive to ultraviolet radiation comprising the step of irradiating a portion of a coupling region of said fused optical fibers with said ultraviolet radiation to change said index of refraction substantially uniformly over said portion of said coupling region until said coupling ratio attains a predetermined value.

2. The method of claim 1, further comprising the step of introducing dopant atoms into said coupling region.

3. The method of claim 2, wherein said dopant atoms comprise hydrogen atoms.

4. The method of claim 1, further comprising the step of elongating said coupling region over a number of power transfer cycles.

5. The method of claim 1, wherein said ultraviolet radiation has a wavelength in the range of 200 nm to 350 nm.

6. The method of claim 1, wherein said ultraviolet radiation is substantially confined to said portion of said coupling region by lenses.

7. The method of claim 1, wherein said ultraviolet radiation comprises a series of pulses.

8. The method of claim 1, wherein said ultraviolet radiation comprises a continuous pulse.

9. The method of claim 1, further comprising a source of said ultraviolet radiation.

10. The method of claim 1, further comprising the step of packaging said fiber optic device.

* * * * *